June 24, 1930. H. B. HOLT 1,767,131
GLASS ROLLING MACHINE
Filed July 19, 1927 2 Sheets-Sheet 1
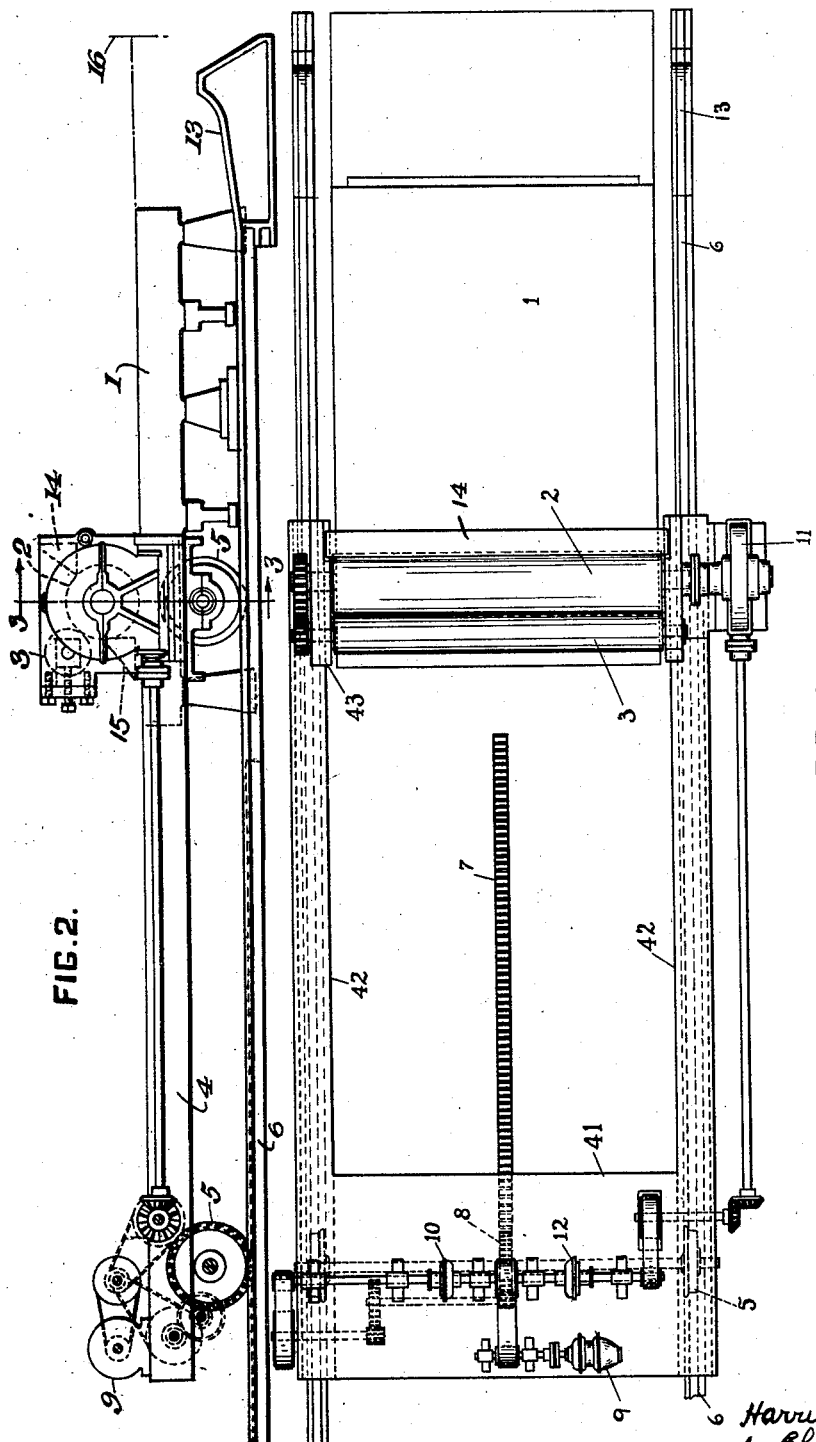
INVENTOR
Harris B. Holt
by Christy and Christy
his attorneys

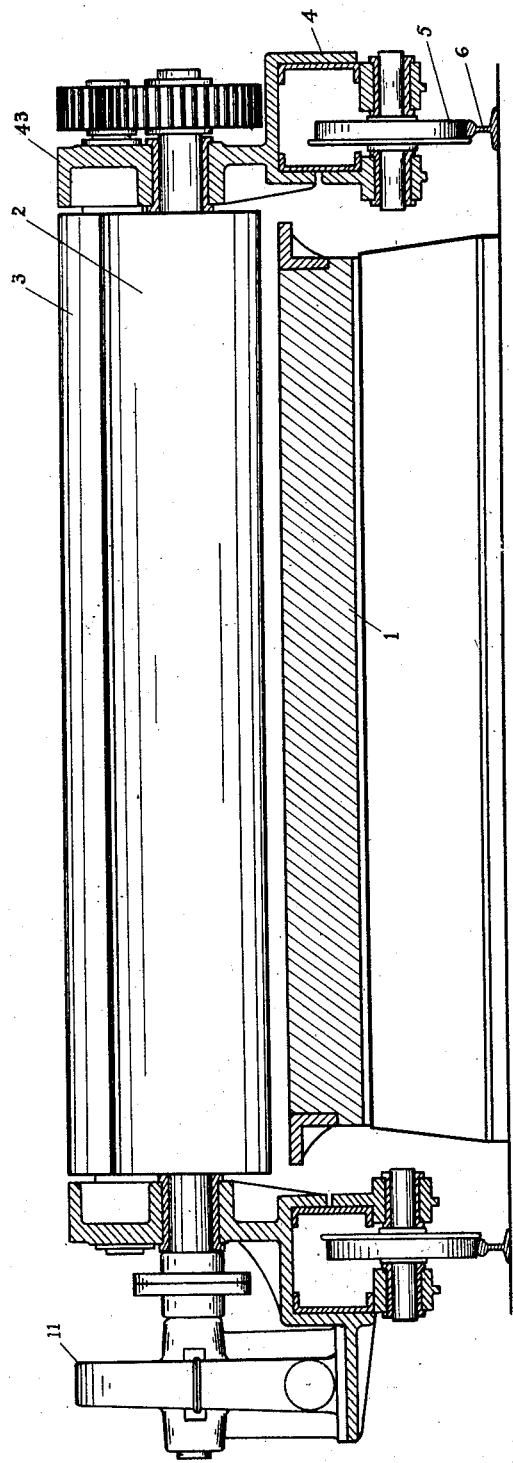

Patented June 24, 1930

1,767,131

UNITED STATES PATENT OFFICE

HARRIS B. HOLT, OF PITTSBURGH, PENNSYLVANIA, ASSIGNOR TO ROSEDALE FOUNDRY & MACHINE COMPANY, OF PITTSBURGH, PENNSYLVANIA, A CORPORATION OF PENNSYLVANIA

GLASS-ROLLING MACHINE

Application filed July 19, 1927. Serial No. 206,880.

My invention relates to the rolling of plate glass and consists in a machine for spreading molten glass to sheet form between rolls and laying it as it is spread on a horizontally extending table top, from which it may be advanced to the leer.

In the accompanying drawings Fig. 1 is a view in plan from above of a machine in which my invention is embodied; Fig. 2 is a view of the same machine in side elevation; and Fig. 3 is a view in transverse section, on the plane indicated at 3—3, Fig. 2. Fig. 3 is drawn to larger scale than the other figures.

The machine illustrated in the drawings includes a table 1 and glass-forming rolls 2 and 3, together with means for effecting relative movement of the parts.

The table 1 may be the familiar stationary horizontally extending table such as is and long has been most generally used in the plate glass industry. It is a feature of my invention that it is capable of being applied to such a table and thus the old piece of apparatus may be kept and converted into part of the new installation. The notable feature in the new installation which characterizes and distinguishes it from the old, is that in the new installation the molten glass is spread between rolls, and after being spread is laid down upon the table top upon which, in the old procedure, the molten glass was first teemed and then spread.

The stationary table is in the old and familiar installation ordinarily arranged adjacent the mouth of the leer, being spaced from the leer at an interval bridged by an apron. This essential arrangement need not be disturbed, and in Fig. 2 of the drawings the vertical line 16 may indicate the position of the leer wall.

Cooperating with the table 1, which in character and arrangement may be such as I have described, a truck 4 is mounted on wheels 5 to travel on tracks 6. This truck, as best seen in Fig. 1, is U-shaped in plan, and includes a body portion 41 of greater width than table 1 and parallel arms 42, spaced apart at an interval exceeding the width of table 1. The truck moves upon its tracks in the direction of the length of table 1 and within the range of its movement the outer ends of the arms 42 advance along the sides of the table from the end of the table remote from the leer, to and beyond the opposite end. In Figs. 1 and 2 the truck is shown in its remote position. A stationary rack 7 extends between the rails 6 and the pitch line of this rack extends in common plane with the surfaces of the rails 6. The rear axle of the truck carries a gear wheel 8 which meshes with the rack 7. The truck carries a motor 9 and from the motor driving connection is made to the rear axle. By such provision the truck may be driven positively and without slipping upon tracks 6. In the driving connection between motor and axle a clutch 10 is included.

Upon the arms 42 of the truck at their extreme ends stand housings 43, in which the glass-spreading rolls 2 and 3 are journalled. The rolls 2 and 3 are geared together, to rotate oppositely at equal surface speed, and upon the axle of one of the rolls (preferably the larger and lower roll, 2) and within a gear case 11 a gear wheel is borne. Driving connection is provided from the motor 9 to the gear wheel within the gear case 11, and in Fig. 1 such driving connection is shown in detail. In this connection also a clutch 12 is included.

At the end adjacent the leer (indicated at 16), the right-hand end, Fig. 2, the tracks 6 are continued in rising inclines 13.

The hopper or receptable for the molten glass is formed by and between the bodies of the rolls 2 and 3 themselves and the block 14. Beneath the roll pass an incline 15 receives the spread but still soft sheet and guides it to position on the top of table 1.

In operation, the parts being in the position shown in Fig. 2, the truck at the remote and left-hand end of its range of travel and the rolls standing adjacent the left-hand end of table 1, a batch of molten glass is teemed from above into the receptacle formed by and between the upper surfaces of the rolls 2 and 3 and block 14, and is properly spread throughout the longitudinal extent of the roll bodies, transversely of the machine. The motor 9 being in operation, clutch 12 is closed and rolls 2 and 3 set in rotation. Roll rotation effects the spreading of the molten glass and the delivery of the sheet still in soft condition downwardly from the roll pass.

At proper time as the developing sheet descends upon incline 15 clutch 10 is closed, and then, while rolling continues, truck 4 advances from left to right upon the stationary table 1. As operation progresses, the sheet is progressively rolled and progressively laid upon the top of table 1.

As the truck approaches the right-hand end of its range of travel, the rolling of the glass being at that time ordinarily completed, the wheels 5 at the forward end pass up the inclines 13, and the structure which extends above the table is raised. In such position the truck may be arrested and then the finished sheet may be pushed in usual manner from the top of table 1 beneath rolls and incline 15, across the usual apron provided for the purpose and into the leer. When this has been done, clutch 12 being open, clutch 10 may be closed, and, the motor being reversed, the truck may be run back to initial position, ready for repeated operation.

The building of the truck to U-shaped plan and the organization of the machine in such manner that throughout the range of truck movement the body portion is disposed beyond one end of the table, makes possible the mounting of the motor upon the body of the truck and of the glass-spreading means upon the arms of the truck, in position to bridge the table. In consequence of such arrangement and spacing apart of motor and glass-spreading means, the bridge structure across the table is not burdened with the weight of the motor; the glass-spreading means are more freely accessible; and the motor is located where the structure may more easily and more effectively be strengthened to carry it.

The use of a single motor both to drive the truck and to rotate the rolls insures correlation in speed and an advance of the truck and a laying of the glass on the table top in exact correspondence to its rate of production. In case an excess quantity of glass is teemed to the rolls in any single operation, the clutch 10 will when the track has reached the end of its range of advance, be disconnected, and then the rolls, continuing to rotate, will deliver all the glass. The excess in the length of the sheet will be cut away and disposed of in the usual manner.

I claim as my invention:

In a glass-rolling machine the combination of a table and a truck movable relatively to the table, the truck including a body portion which throughout the range of truck movement is disposed beyond one end of the table, and including also parallel arms which in the range of truck movement advance and recede along the sides of the table, glass spreading means mounted upon the arms of the truck and in the range of truck movement advancing above the surface of the table, truck driving means including a motor borne by the body of the truck, and driving connection between said motor and glass spreading means.

In testimony whereof I have hereunto set my hand.

HARRIS B. HOLT.